United States Patent [19]
Tsuchiya et al.

[11] Patent Number: 6,111,715
[45] Date of Patent: Aug. 29, 2000

[54] STORAGE APPARATUS USING A MAGNETORESISTIVE HEAD THAT EMPLOYS A SENSE CURRENT SELECTED FROM PLURAL PREDETERMINED SENSE CURRENTS

[75] Inventors: Reijiro Tsuchiya, Fujisawa; Mikio Suzuki, Odawara, both of Japan

[73] Assignee: Hitachi, Ltd., Tokyo, Japan

[21] Appl. No.: 09/005,008

[22] Filed: Jan. 9, 1998

[30] Foreign Application Priority Data

Jan. 13, 1997 [JP] Japan ................................. 9-003575

[51] Int. Cl.⁷ ............................... G11B 5/03; G11B 15/12
[52] U.S. Cl. .................................................. 360/66; 360/61
[58] Field of Search ................................. 360/66, 61, 46, 360/67, 25

[56] References Cited

U.S. PATENT DOCUMENTS

| | | | |
|---|---|---|---|
| 5,412,518 | 5/1995 | Christner et al. | 360/66 |
| 5,642,244 | 6/1997 | Okada et al. | 360/61 |
| 5,774,291 | 6/1998 | Contreras et al. | 360/66 |
| 5,790,331 | 8/1998 | Aranovsky | 360/46 |
| 5,831,782 | 11/1998 | Kohno et al. | 360/66 |
| 5,978,163 | 11/1999 | Cunningham | 360/66 |

FOREIGN PATENT DOCUMENTS 5-325110   12/1993   Japan .

*Primary Examiner*—W. Chris Kim
*Attorney, Agent, or Firm*—Mattingly, Stanger & Malur, P.C.

[57] ABSTRACT

A magnetic storage apparatus exploits the inherent characteristics of a magnetoresistive element to improve the performance of a magnetic head employing the element. Variations in element height or element thickness of the magnetoresistive element are considered in the selection of a sense current appropriate to the element size, by measuring the voltage between the terminals of the magnetoresistive head and controlling the sense current so that the output reference voltage approaches a predetermined value. In another embodiment, the sense current is controlled so that the voltage amplitude or a reference amplitude are set to a predetermined value. In both embodiments, a conversion table is preferably used to relate voltage amplitudes with sense currents, whereby an appropriate sense current is selected based upon the voltage amplitude.

22 Claims, 10 Drawing Sheets

STORAGE APPARATUS USING A MAGNETORESISTIVE HEAD THAT EMPLOYS A SENSE CURRENT SELECTED FROM PLURAL PREDETERMINED SENSE CURRENTS

BACKGROUND OF THE INVENTION

1. Field of the Invention

The present invention relates generally to reproduction of information stored on a magnetic recording medium, and more particularly to magnetic storage apparatus in which information is reproduced by a magnetoresistive element in a magnetoresistive head.

2. Description of the Related Art

Magnetoresistive elements are being adopted increasingly as the information reproducing element in magnetic tape and magnetic disk storage apparatus. The magnetoresistive element undergoes a resistivity change in response to a stray field from the recording medium, a phenomenon known as the magnetoresistance effect. The reproducing sensitivity of the magnetoresistive element is higher than that of the conventional inductive element, and is substantially independent of tape velocity and disk medium rotational speed. These characteristics make the magnetoresistive element quite effective in developing smaller magnetic tape drives, improving the recording density of magnetic tape media, enhancing the capacity of magnetic disk storage apparatus, and in making smaller-diameter magnetic disk media. Thus, magnetic heads equipped with the magnetoresistive elements are being used more and more.

FIG. 1 schematically illustrates a common configuration of a magnetic recording medium (magnetic tape or magnetic disk) and a magnetoresistive element in a magnetoresistive head. Between terminals 2, the magnetoresistive element 1 forms a single magnetic domain, and a bias field is applied to magnetize the magnetoresistive element 1 in a predetermined direction in the absence of a stray field from the recording medium. This region between the terminals 2 is the magnetic sensing part, where the magnetization direction tends to rotate from the normally-biased direction when the stray field 6 from the recording medium 4 is superposed on the bias field. The resistivity of the magnetoresistive element 1 changes in proportion to the rotation angle.

Thus, this region is effective in reproducing information, and the width of this region is the reproducing track width of the magnetic head. Shielding films 3 at both sides of the magnetoresistive element 1 prevent interference between stray fields 6 corresponding to plural information items, which stray fields distinguish each item of information even when the information is recorded at a high density on the recording medium 4.

The resistivity change in the magnetoresistive element 1 in response to the stray field 6 from the recording medium 4 can be converted into an electrical signal by detecting a voltage drop between the two terminals 2 when the sense current 5 supplied to the magnetoresistive element 1 is a constant current, or by detecting a change in the sense current 5 when a constant voltage is applied to the magnetoresistive element 1.

An example of a circuit configuration that may be used as a reproducing circuit for the magnetoresistive element 1 is shown in FIG. 2. In this configuration, the voltage applied to the terminals 2 is controlled by feedback through a low-pass filter 8 so that the sense current, the value of which is defined by an external resistor element 7, is supplied to the magnetoresistive element 1. Accordingly, the sense current 5 supplied to the magnetoresistive element 1 has a constant value that is not dependent upon the resistance of the magnetoresistive element 1. In this configuration, a change in the resistance of the magnetoresistive element 1 caused by the stray field 6 causes a change in the sense current 5 corresponding to the change of resistance, since a constant voltage is applied to the magnetoresistive element 1. This change in the sense current 5 is separated out as a reproduced signal by being converted to a voltage change through a load resistor 9.

A reproducing channel (of a magnetic disk storage apparatus, for example) which utilizes magnetoresistive elements as reproducing elements has generally a composition as shown in the block diagram of FIG. 3. The sense current defining resistor element 7 is connected to a read/write amplifier 10. The reproducing signal is obtained according to the principles described above, by supplying the sense current 5 defined by the resistor element 7 to the magnetoresistive element 1. The other illustrated portions of the reproducing channel are similar to those of the conventional reproducing channel that utilizes inductive elements.

SUMMARY OF THE INVENTION

As mentioned, in the conventional technology, the resistivity change in the magnetoresistive element is detected as a change in the voltage drop in a constant-current system, or as a change in the current through the element in a constant-voltage system. Accordingly, the reproducing signal amplitude varies greatly for different magnetoresistive elements if the resistances of the magnetoresistive elements vary due to differences in the sizes of the magnetoresistive elements.

For example, Japanese unexamined patent publication number 5-325110 discloses a magnetic disk storage apparatus in which the sense current is controlled so as to maximize the reproducing level of the magnetoresistive head. Each magnetoresistive head has its own sense current to give the maximum reproducing output, as shown in FIGS. 4(a) and 4(b). However, the sense current cannot be made excessively large because a larger sense current reduces the lifetime of the magnetoresistive element. Accordingly, a practical upper limit of the sense current should be established, below which the magnetoresistive element should be operated.

A practical upper limit of the sense current can be determined, for example, by a lifetime test of many similar elements (e.g., 10–20 elements). The temperature of the element under test can be calculated from its physical dimensions (especially the height) and the current density. Then, the upper limit can be set based on the product specifications of the apparatus in which the element will be used. For example, in a magnetic disk storage apparatus employing a hard-disk drive (HDD), the predicted lifetime of the HDD is a suitable benchmark for the lifetime of the magnetoresistive element. The sense current upper limit is set accordingly.

In the following explanation, dimensions of the magnetoresistive element are defined as shown in FIG. 5. The lower portion of the figure is the recording medium side, and the depth direction indicates the recording track width direction. As the element height (h) is determined by the machining process, it is apt to vary depending on the processing accuracy. The width (w) and thickness (t) of the element are usually determined by the thin-film process. For this reason, the variance of the element height (h) is larger than that of the width (w) or thickness (t) of the element, which tends to affect the element performance.

As the element height is reduced, the element resistance increases and the reproducing signal amplitude appearing at the element terminals increases, for a constant current. With a constant current, the current density is thus increased, and migration or destruction due to heat generation is apt to occur, deteriorating the lifetime of reliability of the device.

A graphical representation of these relationships appears in FIG. 6. FIG. 6 illustrates the reproduced output as a function of the resistance of the magnetoresistive element, which varies as a function of the element height, and the current density in the magnetoresistive element as a function of the magnetoresistive element resistance. The resistance between the terminals of the head consists of the resistance in the magnetoresistive element itself and the resistance in the terminals and wiring.

When the sense current is kept constant, the change in resistance may cause a change in the current density. For high performance, a large sense current is desired to obtain a large reproducing output. The sense current, however, must not exceed the upper limit of current density, illustrated in the lower portion of FIG. 6, to avoid reducing the lifetime of the magnetoresistive element. Therefore, the reproducing output varies in the range shown in the upper portion of FIG. 6, and for a large element height, the reproducing signal output is low because the resistance of the element is low.

Thus, it has been considered that an element having a large element height has poor performance, because its reproduced output is low due to its low resistance. However, since the current density in an element having a large element height is small, the reproduced output can be increased without deteriorating the reliability of the magnetoresistive element, by increasing the sense current in the range below the upper limit of the current density. Thus, the present inventors have discovered that the conventional technology has not fully utilized the performance of an element having a large element height. A similar analysis can be made with respect to an element having a large element thickness.

Therefore, the present invention provides a magnetic storage apparatus which fully utilizes the performance of the magnetoresistive element, by compensating for an apparent lack of performance due to variation in the element height or element thickness.

The invention accomplishes its objectives by monitoring the voltage output between the terminals of the magnetoresistive element, and by changing the sense current supplied to the magnetoresistive element so that the voltage between the terminals is at least approximately equal to a predetermined value. The invention can be applied to various magnetic storage apparatus, including magnetic tape and magnetic disk storage apparatus.

The invention also accomplishes its objectives by changing the sense current supply to the magnetoresistive element so that the amplitude of a prerecorded reference amplitude signal reproduced from tracking information on the recording medium is at least approximately equal to a predetermined value.

DETAILED DESCRIPTION OF THE PREFERRED EMBODIMENTS

Figure 1:
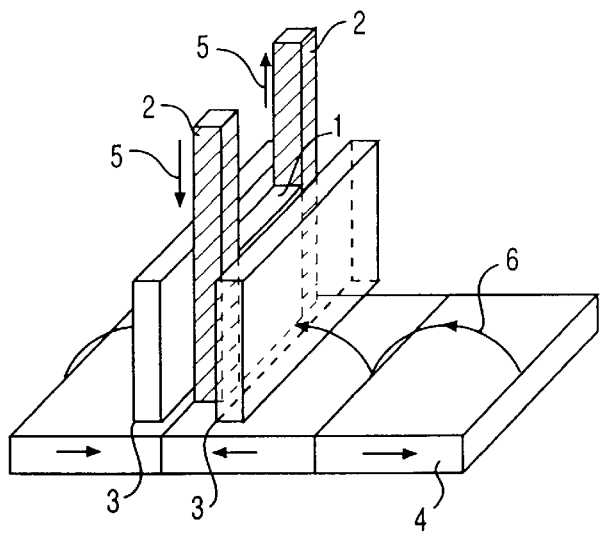
FIG. 1 is a schematic illustration of a magnetoresistive element and its relation to a recording medium.
Figure 2:
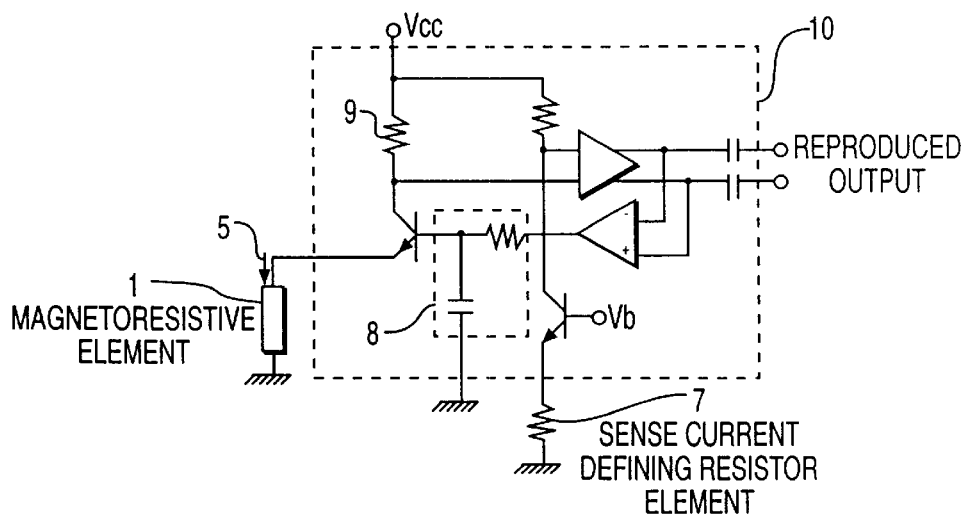
FIG. 2 shows a conventional reproducing circuit utilizing a magnetoresistive element.
Figure 3:
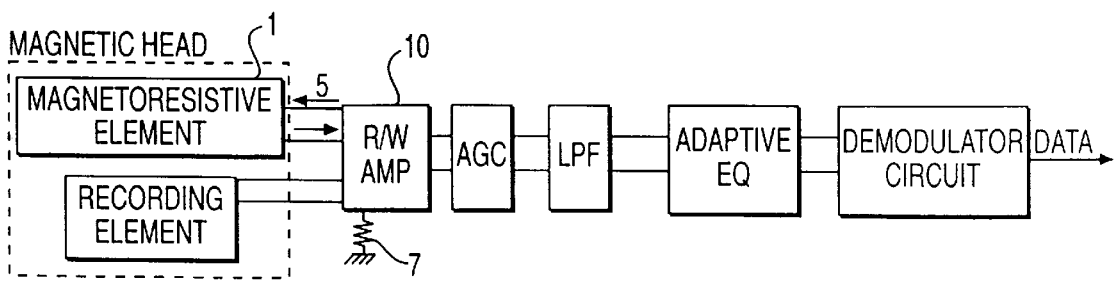
FIG. 3 is a block diagram of a reproducing channel of a conventional magnetic storage apparatus.
Figure 4A:
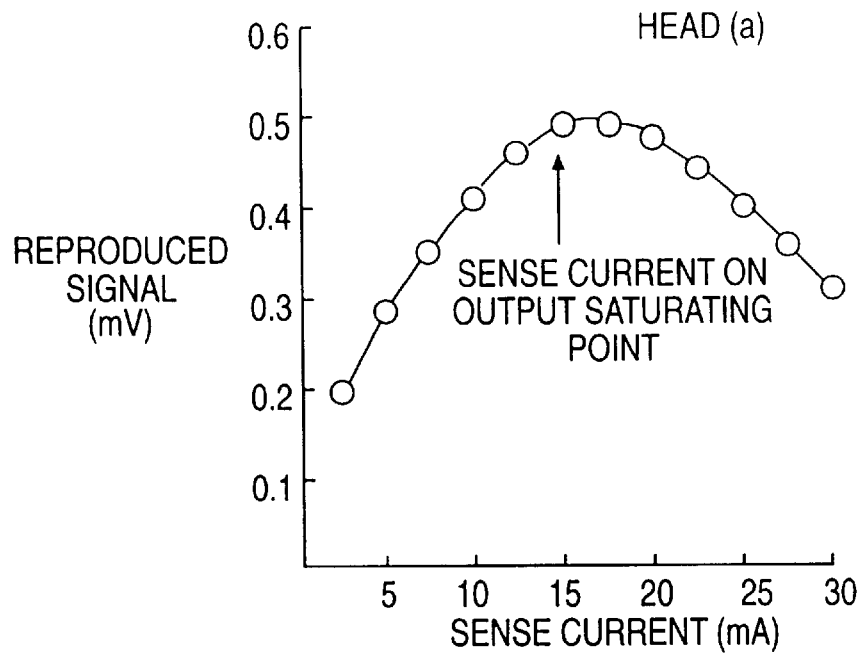
FIGS. 4(*a*) and 4(*b*) illustrate conventional sense current control of two different reproducing heads.
Figure 4B:
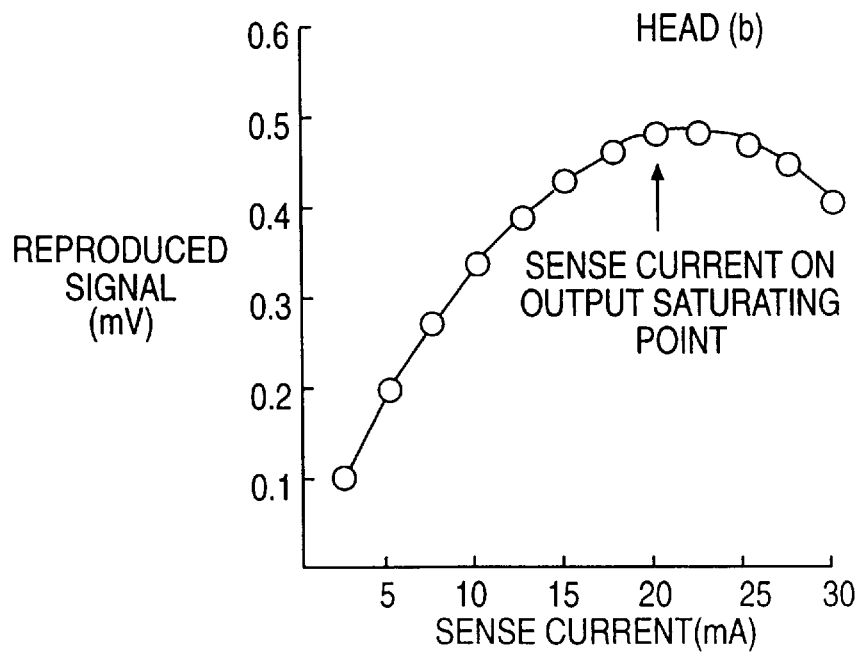
Figure 5:
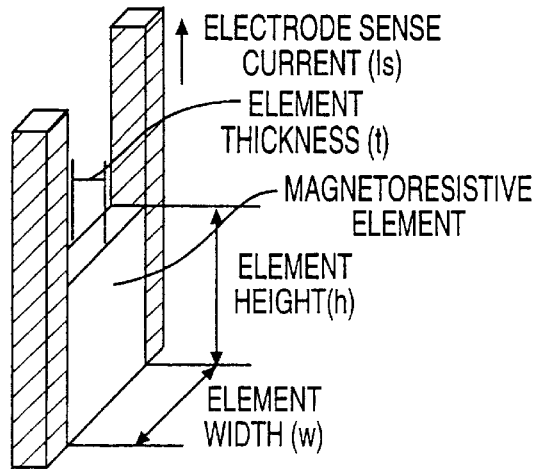
FIG. 5 schematically illustrates the fundamental dimensions of a magnetoresistive element.
Figure 6:
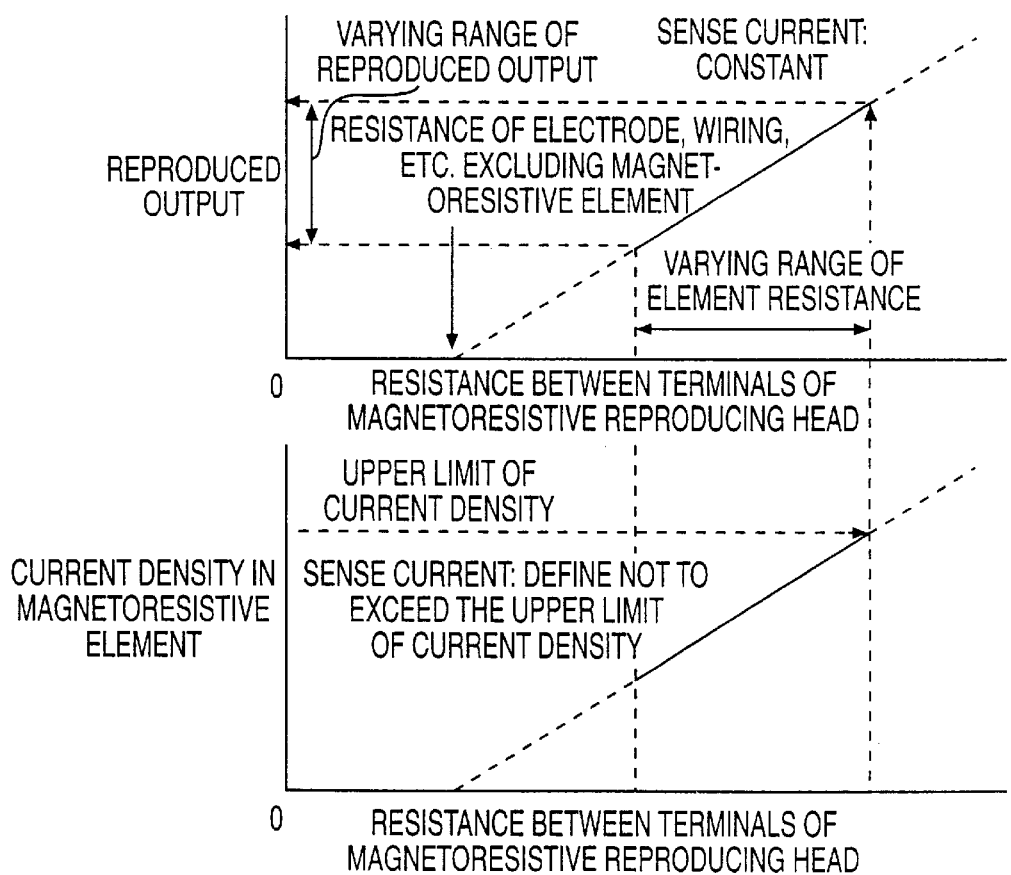
FIG. 6 is a conceptual graphical representation showing a relationship between reproduced output and magnetoresistive head resistance, and a relationship between current density and magnetoresistive head resistance, considering variations in the element height.
Figure 7:
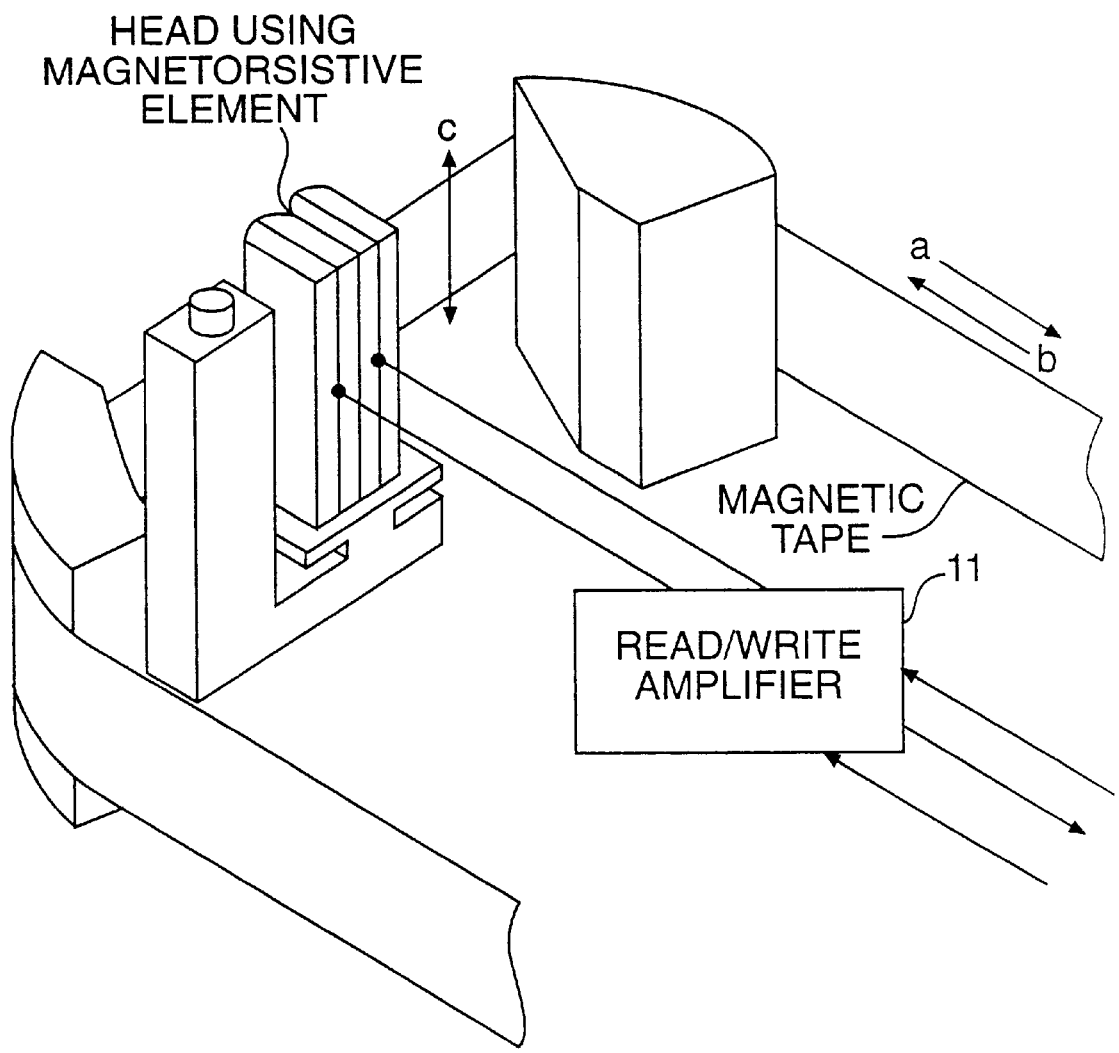
FIG. 7 illustrates a magnetic tape storage apparatus to which the present invention may be applied.

FIG. 7 schematically shows a magnetic tape storage apparatus to which the present invention may be applied. Information is recorded or reproduced through the running of a magnetic tape in contact with or spaced slightly from a magnetic head positioned along the tape traveling path. A plurality of magnetic heads using magnetoresistive elements may be arranged along the tape width direction c for information reproduction. The magnetic tape can travel in the forward or reverse directions (a or b) for either recording or reproduction. The magnetic heads are connected to a read/write amplifier 11, which amplifies small signals detected from the magnetic tape and amplifies write signals to be recorded on the tape. The read/write amplifier 11 may also perform a selecting function to be described below.

Figure 8:
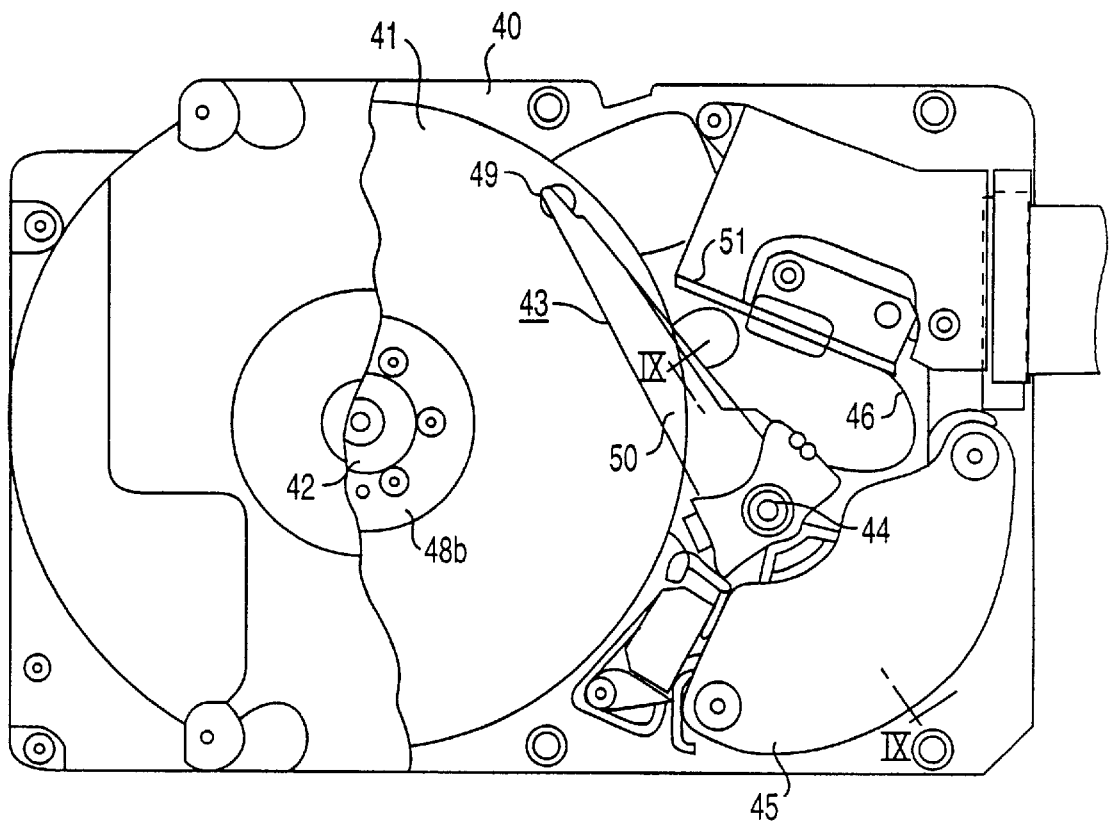
FIG. 8 is a plan view of a magnetic disk storage apparatus to which the present invention may be applied.
Figure 9:
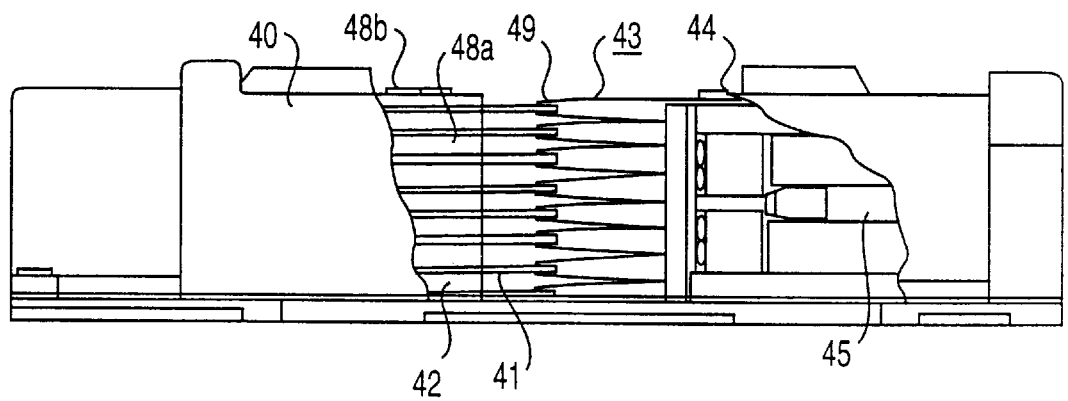
FIG. 9 is a side view, partially in cross-section taken along lines IX—IX, of the magnetic disk storage apparatus shown in FIG. 8.

A magnetic disk storage apparatus to which the invention may be applied is explained next, referring to FIGS. 8 and 9. Within an enclosure 40, recording disks 41, and a spindle motor 42 for supporting and rotating the disks 41, head assemblies 43 including magnetic heads and suspension arms 50, a swing arm including a pivot shaft 44 which suspends the head assemblies and causes them to traverse on the disk surfaces, a voice coil motor 45 which drives the swing arm, circuits 51 for recording or reproducing information with respect to the disks 41 through the magnetic heads, and a printed circuit board 46 connecting a controller to the spindle motor 42 and voice coil motor 45 are provided. The disks 41, spindle motor 42, head assemblies 43, printed circuit board 46, and voice coil motor 45 are hermetically sealed within the enclosure 40.

Illustratively, the spindle motor 42 is an in-hub-type motor which has a hub to which the disks 41 are fixed, and a rotor and stator within the hub. The spindle motor 42 is fixed on a base of the enclosure 40. The spindle motor need not be an in-hub-type motor.

The disks 41 (typically rigid, or hard, disks) constitute the data storage capacity of the disk storage apparatus. There may be one or several disks in the apparatus, depending on the desired storage capacity. The disks 41 and disk spacers 48a are alternately inserted on the hub of the spindle motor 42. A disk clamp 48b fixes the disks 41 to the spindle motor 42 by pressing down on the disk stack in the direction of the shaft of the spindle motor 42.

Several swing arms, depending on the number of disks, are provided. A swing arm is composed of a slider 49 which supports the magnetic head, and a suspension arm 50. The swing arms are rotatably fixed to the base via the pivot shaft 44.

Preferably, each magnetic head is a duel head integrating a thin-film recording head and a magnetoresistive reproducing head, and is fixed to the slider 49.

Figure 10:
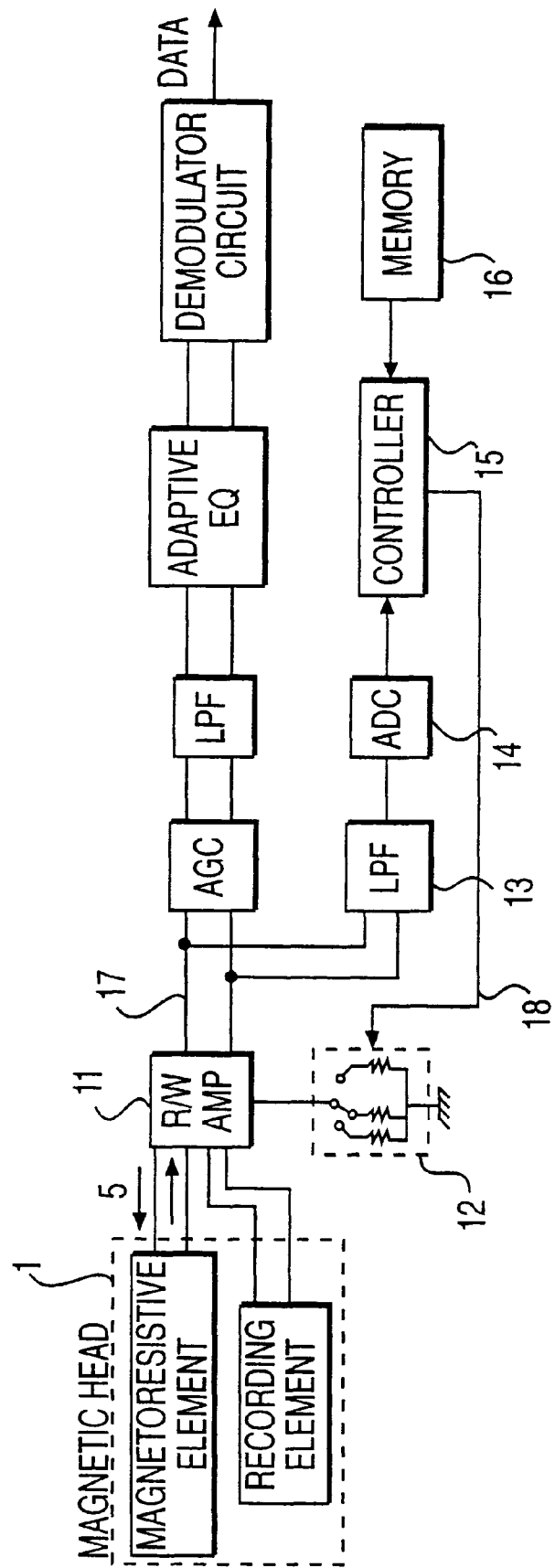
FIG. 10 is a block diagram of a reproducing channel of a magnetic storage apparatus according to a first embodiment of the invention.

A block diagram of a reproducing channel used in a magnetic apparatus according to a first embodiment of the invention is shown in FIG. 10. The illustrated reproducing channel includes a read/write amplifier 11 connected to a magnetoresistive element 1 of the magnetic head. The read/write amplifier 11 supplies a sense current 5 to the magnetoresistive element 1, and receives signals from the magnetoresistive element 1 in accordance with the information read from the recording medium. The read/write amplifier 11 outputs the reproduced signals at reproducing output terminals 17, which signals are superpositions of a differentially reproduced signal and a voltage between the terminals of the magnetoresistive head.

An automatic gain control amplifier AGC inputs the differential reproducing signal, and provides an output to a reproducing channel constituted by a low-pass filter LPF, an adaptive equalizer, and a demodulator circuit. The output of the demodulator circuit is the data reproduced from the recording medium.

A low-pass filter LPF 13 also receives the outputs from the read/write amplifier 11, and separates a DC component of the differential reproducing signal. The LPF 13 outputs the DC component to an analog/digital converter ADC 14, which converts the DC components into a digital signal and outputs the digital signal to a controller 15. The controller 15 consults a memory 16, which contains a conversion table associating the digital reproduced signal with stored sense current defining values. In accordance with a received digital signal, the controller 15 outputs a sense current defining signal 18 based upon the corresponding values stored in the memory 16, to a sense current defining circuit 12. The sense current defining circuit 12 sets the sense current 5 to be output by the read/write amplifier 11, preferably using a switch circuit, in accordance with the sense current defining signal 18.

It is noted that the elements of a single-head apparatus have been described by way of example, but the invention is equally applicable to a storage apparatus, such as a multiple-disk drive, that employs plural heads. In such a case, the selection of a sense current is preferably performed separately for each head, using the conversion table in the memory 16.

The control program for the controller 15 can incorporate the conversion table, in which case the memory 16 is not necessary.

Figure 11:
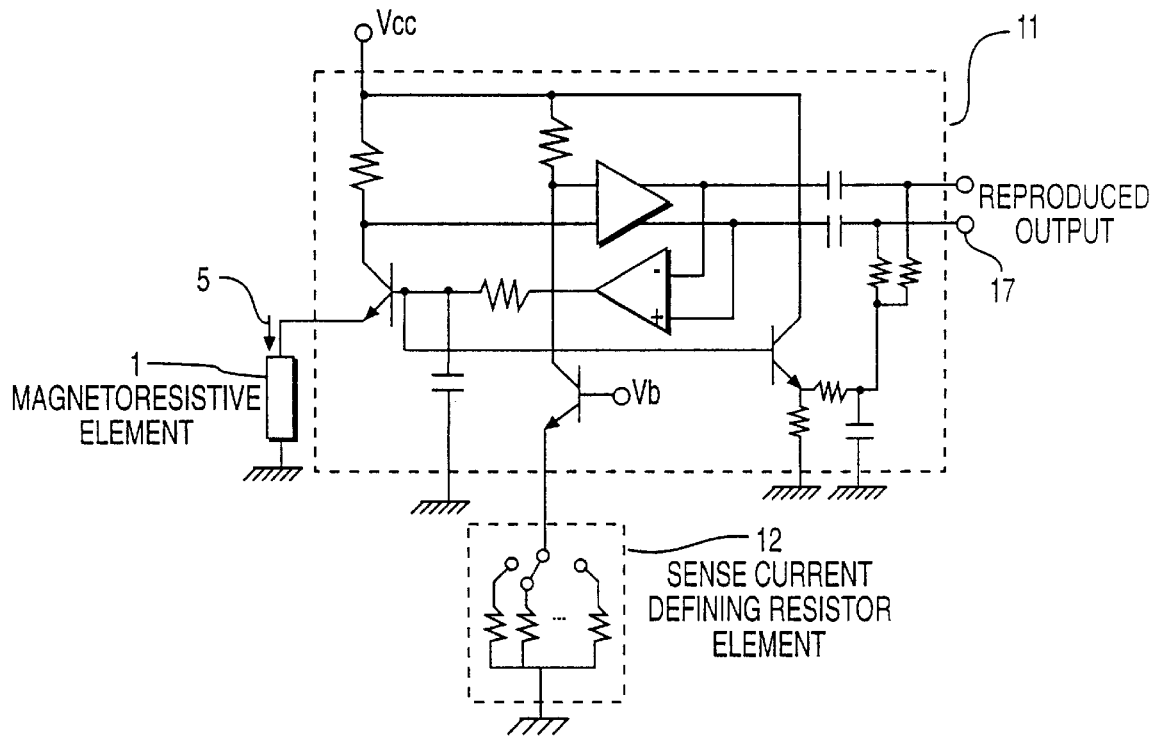
FIG. 11 shows an example of a reproducing circuit employing a magnetoresistive element according to the present invention.

FIG. 11 schematically illustrates a preferred configuration of the read/write amplifier 11. A voltage appearing between the terminals sandwiching the magnetoresistive element 1 is input to an LPF through a buffer, and has its high-frequency component rejected by the LPF. Without the high-frequency component, a differential signal is output at the terminals 17.

The resistance of the magnetoresistive head ($R_h$) is constituted by the resistance of the magnetoresistance element 1 ($R_{mr}$) and the cumulative resistance of other elements of the head ($R_{other}$), such as the electrodes, wiring, etc. $R_{other}$ is nearly constant, and can be determined in advance. The conversion table associates the resistances $R_{other}$ and the sense current defining signals 18. Therefore, the voltage between the magnetoresistive head terminals can be calculated from the established sense current and the resistance between the head terminals, using Ohm's Law. After the sense current has been calculated so as to set a voltage between the head terminals, the defining sense current signal value to be sent to the sense current defining circuit 12 can be obtained from the table. Thus, the voltage between the terminals of the magnetoresistive head can be defined to an almost constant value.

Figure 12:
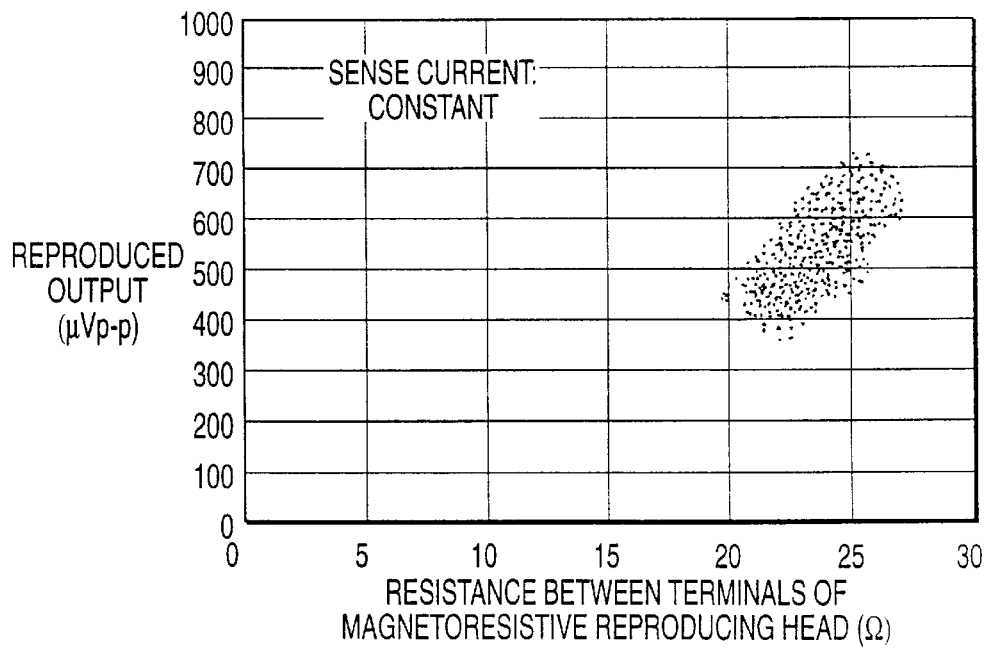
FIG. 12 shows the variation in the reproduced output when the sense current is kept constant according to conventional technology.

Turning to FIG. 12, for a constant sense current in a conventional reproducing channel, the reproduced output of the magnetoresistive reproducing head is shown as a function of the resistance between the terminals of the head, for a constant sense current. The reproduced output is about 600 $\mu$V p-p over a varying resistance below approximately 27 ohms. The sense current is fixed to 11 milliamperes, within the allowable maximum current density to be supplied to the head (20 megaamperes per square centimeter, approximately). Note that the resistance between the head terminals is different than the resistance between the ends of the magnetoresistive element itself.

The reproduced output varies in a range between about 400 $\mu$V p-p to 700 $\mu$V p-p (FIG. 12 shows extremes at about 350 $\mu$V p-p to 750 $\mu$V p-p), and the voltage between the terminals of the magnetoresistive reproducing head is 297 millivolts at maximum. The characteristics shown in FIG. 12 do not exhibit a straight-line correlation, due to the variance in the floating height, element width, element sensitivity, etc. However, the inventors' analysis shown in FIG. 12 illustrates an increasing tendency in the correlation, which in turn shows that the variance in element height and/or element thickness has a significant influence on the reproduced output.

Figure 13:
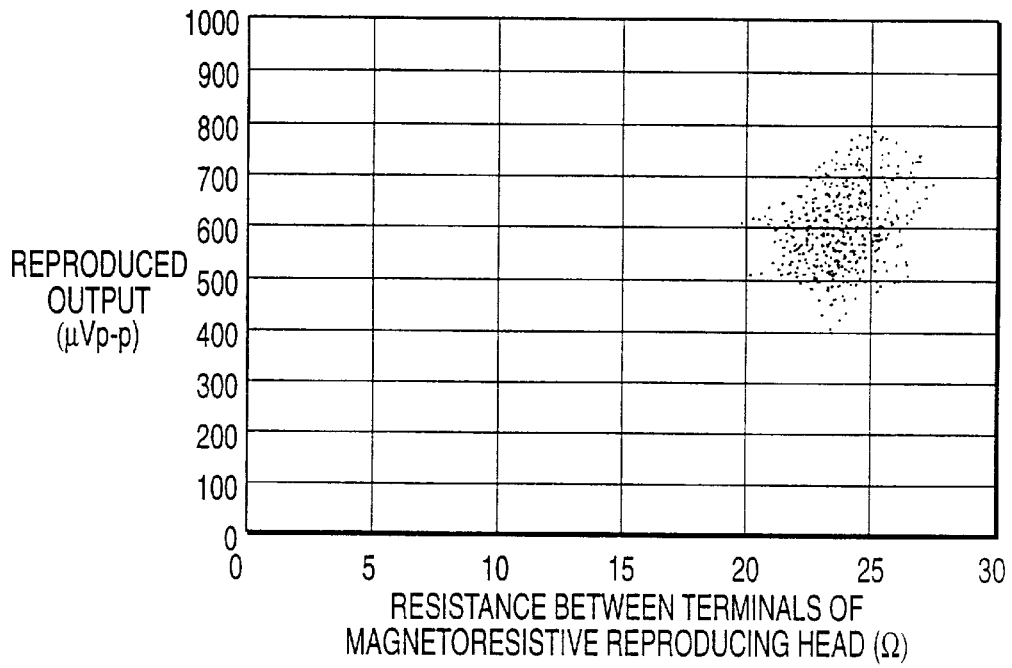
FIG. 13 shows the variation in the reduced output when the sense current is controlled according to the first embodiment of the present invention.

FIG. 13 illustrates the inventors' analysis for a sense current controlled according to the teachings of the present invention. In this instance, the maximum current density is limited to 20 $\mu$V p-p per square centimeter as in FIG. 12, and the sense current is switched in eight steps.

Figure 14:
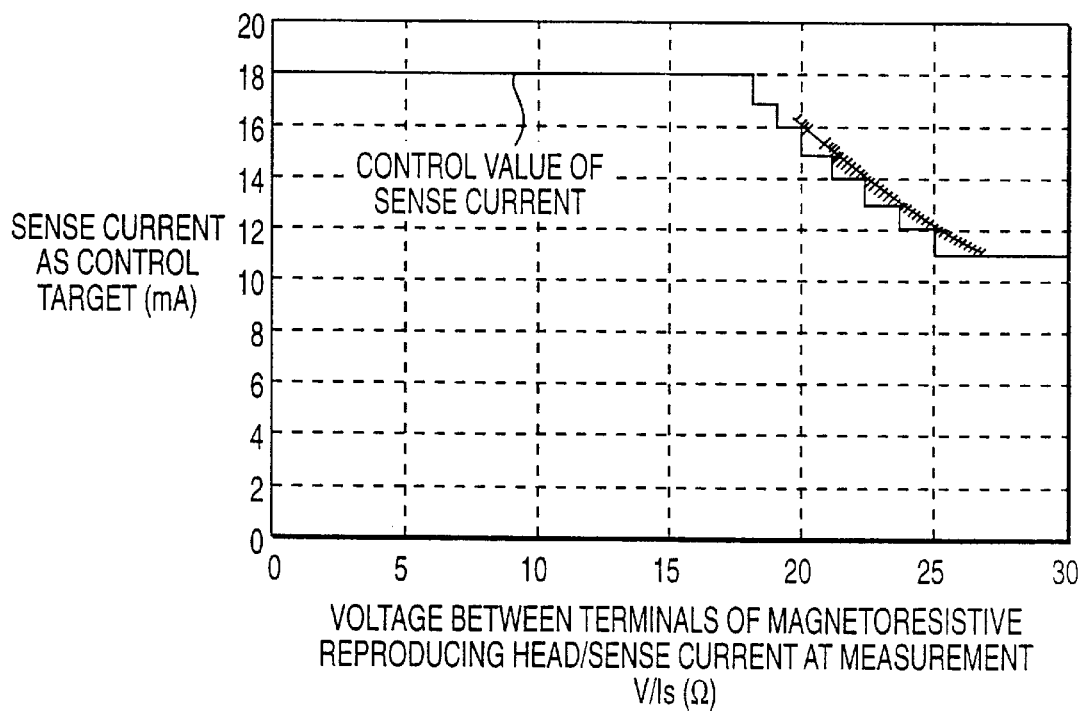
FIG. 14 graphically illustrates the determination of the sense current control value according to the first embodiment of the present invention.

With reference to FIG. 14, the resistance between the terminals of the magnetoresistive reproducing head, excluding the resistance of the magnetoresistive element, is determined to be about 5 ohms by measurement of the head. Thus, applying this value to the conventional case described above, where the sense current was fixed to 11 milliamperes, the voltage between the terminals of the magnetoresistive element is 254 millivolts at maximum. Consequently, when the sense current is increased such that the voltage between the ends of the magnetoresistive element itself does not exceed 242 millivolts, the current density in the magnetoresistive element is maintained at nearly the same current density as in the conventional case, and the reliability of the element (i.e., its electrical lifetime) is about the same as in the conventional case.

FIG. 14 plots the sense current at which the voltage between the ends of the magnetoresistive element itself in the magnetoresistive reproducing head is estimated to be nearly 242 millivolts. The horizontal axis is the voltage between the terminals of the head, normalized by the sense current Is used at the time the voltage was measured between the terminals. The value on the horizontal axis corresponds to the value that the disk controller 15 can evaluate using the digital signal output by the ADC 14 and the defined sense current.

The sense current as a control target is determined so as not to exceed the value of the points on the curve (solid line) shown in FIG. 14. As a result, the reproducing sensitivity can be improved while maintaining the reliability of the magnetoresistive element. The control target sense currents are contained in a conversion table, depicted below, with correspondence to various normalized voltages as shown in FIG. 14. The conversion table is preferably stored in the memory 16 in the FIG. 10 embodiment. The disk controller 15 sends the sense current defining signal 18 to the sense current defining circuit 12, and performs the sense current switching according to the relationship shown in FIG. 14.

TABLE

| V/Is (Ω) | TARGET SENSE CURRENT (mA) |
| --- | --- |
| V/Is ≧ 25.2 | 11.0 |
| 23.6 ≦ V/Is < 25.2 | 12.0 |
| 22.3 ≦ V/Is < 23.6 | 13.0 |
| 21.1 ≦ V/Is < 22.3 | 14.0 |
| 20.1 ≦ V/Is < 21.1 | 15.0 |
| 19.2 ≦ V/Is < 20.1 | 16.0 |
| 18.4 ≦ V/Is < 19.2 | 17.0 |
| V/Is < 18.4 | 18.0 |

In the present invention, the reproduced output is found to vary within a range of 480 $\mu$V p-p to 800 $\mu$V p-p (FIG. 13 shows a range of 420 $\mu$V p-p to 800 $\mu$V p-p). The output at the minimum of the range is increased by about 20% as compared with the conventional case shown in FIG. 12, and the variance range of the reproduced signal is decreased as well. As a result, magnetic disk apparatus employing the teachings of the invention are improved.

Thus, according to the present embodiment, by switching the sense current based on a measurement of the voltage between the terminals of the magnetoresistive reproducing head, the variance in the reproducing sensitivity can be decreased. The current density can be kept to about the same level as the conventional maximum sense current density, increasing the reproduced output by as much as about 20%, without deteriorating the reliability of the magnetoresistive element. As a result, the signal-to-noise ratio of the reproduced signal is improved.

Although FIG. 10 shows the sense current defining circuit 12 as a circuit element separate from the read/write amplifier 11, the sense current defining circuit 12 can be included in the read/write amplifier 11. Furthermore, the LPF 13 and the ADC 14, as well as other functional blocks shown in FIG. 10, can be included in the same integrated circuit with the read/write amplifier or that of controller 15.

Furthermore, the read/write amplifier 11 can output the voltage measured between the head terminals at separate output terminals from the reproducing signal output, and be directly input to the ADC 14 without being superposed on the reproducing output signal at the terminal 17. In this case, the LPF 13 is not required.

The voltage between the terminals of the magnetoresistive reproducing head can be measured continuously or intermittently, and can be evaluated for each head of a multi-head apparatus or for every cylinder position at the start-up of the apparatus, and stored in the memory 16. Alternatively, the evaluation can be performed and recorded on the magnetic recording medium prior to shipment of the apparatus (for example, on the magnetic disk prior to shipment of the magnetic storage disk apparatus), and read out and stored in the memory 16 at the start-up of the apparatus.

FIG. 12 illustrates that the reproduced output has a correlation with the resistance measured between the terminals of the magnetoresistive reproducing head when the sense current is kept constant. Thus, this correlation indicates that the reproduced output can be used as a monitor of the resistance between the head terminals. The second embodiment of the present invention, explained with reference to FIG. 15, controls the sense current based on the reproduced output.

Figure 15:
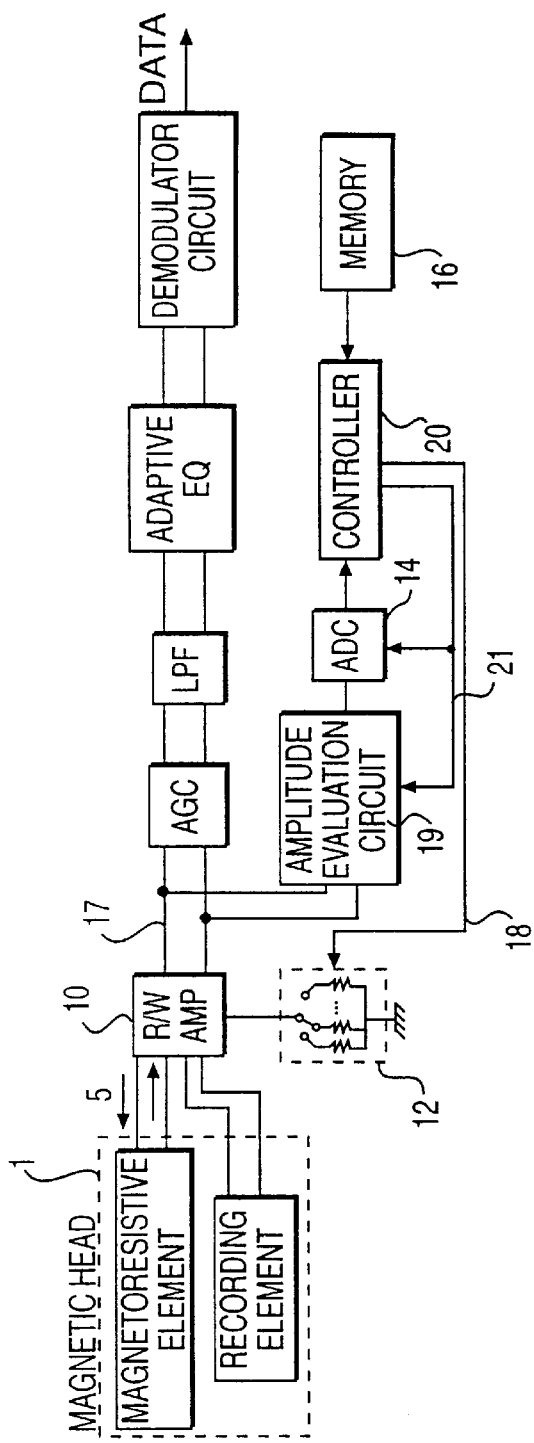
FIG. 15 is a functional block diagram of a reproducing channel of a magnetic storage apparatus according to a second embodiment of the present invention.

As shown in FIG. 15, the second embodiment includes a reproducing channel having a read/write amplifier 10 for supplying the sense current 5 to the magnetoresistive element 1, and for outputting the reproduced differential signal at the reproducing output terminals 17. The reproduced output signal is input to the AGC amplifier, the low-pass filter LPF, the adaptive equalizer, and the demodulator circuit, from which the data are output as described above with reference to FIG. 10.

An amplitude evaluation circuit 19 also receives the differential reproducing signal 17, a servo gate signal, and an AGC hold signal 21, and outputs the effective voltage amplitude derived from the servo reference amplitude signal. The amplitude evaluation circuit 19 can be a separate circuit element as illustrated, or included in the read/write amplifier 10. The amplitude evaluation circuit output is delivered to the ADC 14, which converts the servo reference amplitude signal into a digital signal, and provides the digitized output to a disk controller 20. The disk controller 20 outputs the sense current defining signal 18, derived from the conversion table in memory 16, to the sense current defining circuit 12, which switches the sense current accordingly.

As in the first embodiment described above, the memory 16 can be incorporated in a program that controls the controller 20, in which case the separate memory 16 is not required.

A servo track previously recorded on the magnetic recording medium contains tracking information, including at least a reference amplitude signal. In the diagram shown in FIG. 15, the amplitude evaluation circuit 19 evaluates the voltage amplitude represented by the reference amplitude signal. If the amplitude evaluation circuit 19 is composed by a peak hold circuit, it can evaluate the amplitude of the reference amplitude signal. Further, if the amplitude evaluation circuit 19 is composed by a full-wave rectifier and an integrator, it can evaluate the effective value by comparing the output with a predetermined reference value.

Figure 16:
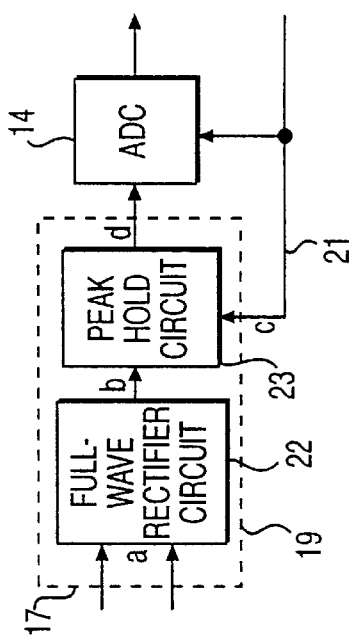
FIG. 16 is a block diagram of an amplitude evaluation circuit including a peak hold circuit.
Figure 17:
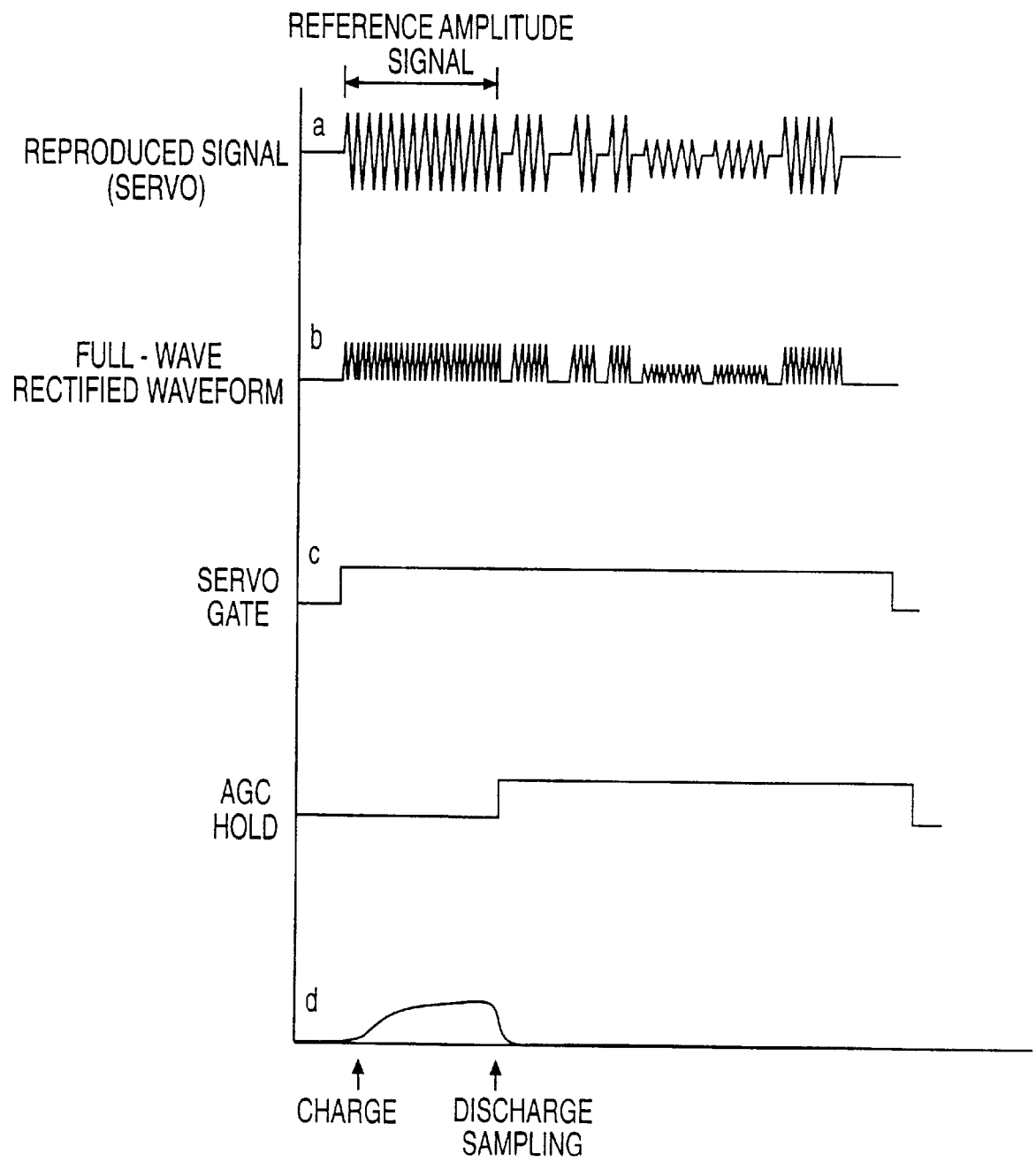
FIG. 17 is a set of waveforms illustrating the amplitude evaluation of the amplitude evaluation circuit shown in FIG. 16.

FIG. 16 illustrates an example of a block diagram of the amplitude evaluation circuit 19 when it is composed by a peak hold circuit. FIG. 17 shows timing waveforms relating to the amplitude evaluation circuit 19 of FIG. 16.

The reference amplitude signal is included in the reproduced signal of the servo, and is input to a full-wave rectifier circuit 22 included in the amplitude evaluation circuit 19. The reference amplitude signal is thus converted to a full-wave-rectified waveform, and sent to a peak hold circuit 23. The peak hold circuit 23 generates and outputs a peak hold waveform in the reference amplitude signal section, referring to the timing of the servo gate signal and the servo AGC hold signal 21. The peak hold waveform is sampled by the disk controller 20 at the rise time of the servo AGC hold signal, via ADC 14. The operation of the second embodiment is the same as that of the first embodiment following this point.

According to this second embodiment, sense current control is performed without dependence on the data reproducing state or on the operating state of the magnetic storage apparatus during movement of the magnetic head. Instead, the evaluated value of the voltage amplitude or its effective value as represented by the reference amplitude signal included in the servo tracking information is the basis for the sense current control.

According to both of the embodiments set forth above, the performance of a magnetic storage apparatus incorporating the teachings of the present invention is improved because the performance of the magnetoresistive element is fully developed and exploited, by decreasing the previously apparent performance deterioration (decrease in the reproduced output) due to the variations in the element height or element thickness.

Variations of the preferred embodiments set forth in the foregoing description will become apparent to those of ordinary skill in the art. All such variations or modifications that basically rely upon the teachings through which the invention has advanced the state of the art are properly considered within the spirit and scope of the invention.

We claim:

1. A magnetic storage apparatus, comprising:
    a magnetic head including a reproducing head having a magnetoresistive element; and
    an electronic circuit which converts a detected change in the resistance of said magnetoresistive element into an electrical reproducing signal output, obtains a voltage amplitude signal representing the voltage between the terminals of said magnetoresistive element, generates a sense current control signal corresponding to said voltage amplitude signal, selects a target sense current from a plurality of predetermined possible values according to the sense current control signal so that the target sense current is nearest to and below a predetermined value, and supplies the target sense current to the magnetoresistive element.

2. A magnetic storage apparatus as claimed in claim 1, wherein the electronic circuit includes a conversion table containing a correspondence between predetermined possible values of said voltage amplitude signal and corresponding sense current control signals, the generated sense current control signal being selected from the conversion table in accordance with a correspondence with the obtained voltage amplitude signal.

3. A magnetic storage apparatus as claimed in claim 2, wherein the electronic circuit includes:
    an amplifier which supplies the target sense current to the magnetoresistive element and converts the detected change in the resistance of said magnetoresistive element into an electrical reproducing signal output;
    a control circuit which obtains the voltage amplitude signal representing the voltage between the terminals of the magnetoresistive element, generates the sense current control signal corresponding to the voltage amplitude signal, and outputs the sense current control signal to the amplifier for controlling the sense current supplied to the magnetoresistive element; and
    a memory containing the conversion table.

4. A magnetic storage apparatus as claimed in claim 3, wherein the control circuit includes an amplitude evaluation circuit for evaluating the voltage amplitude signal, and for outputting one of the evaluated voltage amplitude signal and a reference amplitude signal.

5. A magnetic storage apparatus as claimed in claim 3, wherein said voltage amplitude signal is a DC component of the voltage between the terminals of said magnetoresistive element.

6. A magnetic storage apparatus as claimed in claim 5, wherein the control circuit includes an amplitude evaluation circuit for evaluating the voltage amplitude signal, and for outputting one of the evaluated voltage amplitude signal and a reference amplitude signal.

7. A magnetic storage apparatus as claimed in claim 2, wherein said voltage amplitude signal is a DC component of the voltage between the terminals of said magnetoresistive element.

8. A magnetic storage apparatus as claimed in claim 7, wherein the electronic circuit includes an amplitude evaluation circuit for evaluating the voltage amplitude signal, and for outputting one of the evaluated voltage amplitude signal and a reference amplitude signal.

9. A magnetic storage apparatus as claimed in claim 1, wherein said voltage amplitude signal is a DC component of the voltage between the terminals of said magnetoresistive element.

10. A magnetic storage apparatus as claimed in claim 1, wherein the electronic circuit includes an amplitude evaluation circuit for evaluating the voltage amplitude signal, and for outputting one of the evaluated voltage amplitude signal and a reference amplitude signal.

11. A magnetic storage apparatus, comprising:
    a plurality of magnetic heads, each of said heads including a reproducing head having a magnetoresistive element; and
    an electronic circuit which converts a detected change in the respective resistance of each magnetoresistive element into a respective electrical reproducing signal output, obtains a respective voltage amplitude signal representing the voltage between the terminals of each magnetoresistive element, generates a respective sense current control signal corresponding to each respective voltage amplitude signal, selects each respective sense current from a plurality of predetermined possible values according to the sense current control signal so that the sense current is nearest to and below a predetermined value, and supplies the selected sense current to the magnetoresistive element.

12. A magnetic storage apparatus as claimed in claim 11, wherein the electronic circuit includes a conversion table containing a correspondence between predetermined possible values of said voltage amplitude signal and corresponding sense current control signals, the generated respective sense current control signals being selected from the conversion table in accordance with a correspondence with the obtained respective voltage amplitude signals.

13. A magnetic storage apparatus as claimed in claim 12, wherein each respective voltage amplitude signal is a DC component of the voltage between the terminals of a respective magnetoresistive element.

14. A magnetic storage apparatus as claimed in claim 11, wherein each respective voltage amplitude signal is a DC component of the voltage between the terminals of a respective magnetoresistive element.

15. A magnetic storage apparatus as claimed in claim 12, wherein the electronic circuit includes:

an amplifier which supplies the respective sense current to each magnetoresistive element and converts the detected change in the respective resistance of each magnetoresistive element into a respective electrical reproducing signal output;

a control circuit which obtains the respective voltage amplitude signal representing the voltage between the terminals of each magnetoresistive element, generates the respective sense current control signal corresponding to each respective voltage amplitude signal, and outputs the respective sense current control signal to the amplifier for controlling the respective sense current supplied to each of the respective magnetoresistive elements; and a memory containing the conversion table.

16. A magnetic storage apparatus as claimed in claim 15, wherein each respective voltage amplitude signal is a DC component of the voltage between the terminals of a respective magnetoresistive element.

17. A storage apparatus having plural magnetoresistive heads, each of said magnetoresistive heads having a magnetoresistive element, comprising:

a first circuit that selects a sense current from a plurality of predetermined selectable sense currents available to be supplied to any of the plural magnetoresistive heads; and a second circuit that switchably and sequentially supplies the selected sense current to one of the magnetoresistive heads.

18. A storage apparatus as claimed in claim 17, wherein the second circuit switches the sense currents in eight steps.

19. A storage apparatus as claimed in claim 17, wherein the first circuit includes a conversion table containing correspondences between predetermined possible values of voltage amplitude signals representing signals reproduced by the plural magnetoresistive heads and corresponding sense current control signals, derives voltage amplitude signals from the plural magnetoresistive heads, and selects the sense currents to be supplied to the plural magnetoresistive heads by outputting sense current control signals selected from the conversion table in accordance with correspondences with the obtained voltage amplitude signals.

20. A storage apparatus as claimed in claim 19, further comprising an amplifier which supplies sense currents to the plural magnetoresistive heads and converts detected resistance changes of said plural magnetoresistive heads into electrical reproducing signal outputs;

wherein said first circuit includes:

a control circuit which obtains the voltage amplitude signals from the plural magnetoresistive heads, and outputs the sense current control signals to the amplifier for controlling the sense currents supplied to the plural magnetoresistive heads; and a memory containing the conversion table;

wherein the control circuit accesses the conversion table to select the sense current control signals to be output to the amplifier.

21. A storage apparatus as claimed in claim 20, wherein the control circuit includes an amplitude evaluation circuit for evaluating the voltage amplitude signals, and for outputting one of an evaluated voltage amplitude signal and a reference amplitude signal for each of the plural magnetoresistive heads.

22. A storage apparatus as claimed in claim 21, further comprising recording media from which said plural magnetoresistive heads reproduce information, wherein the recording media contain the reference amplitude signals.

* * * * *